Dec. 17, 1935.   A. BRUNNER   2,024,507
HOSE FITTING
Filed Feb. 26, 1932
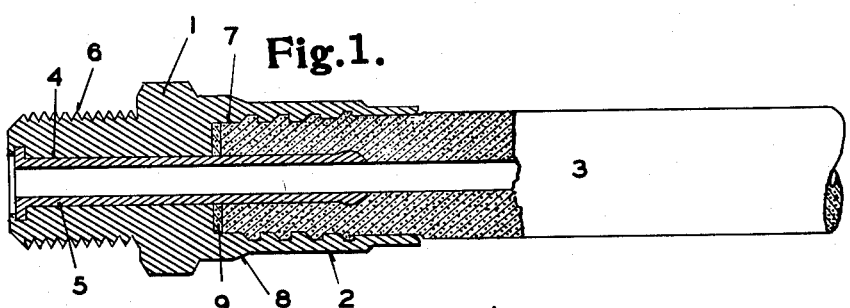
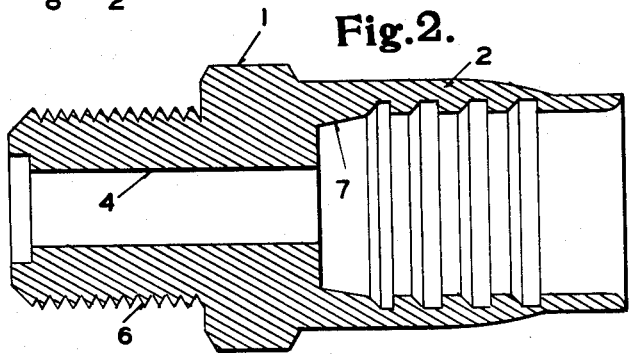
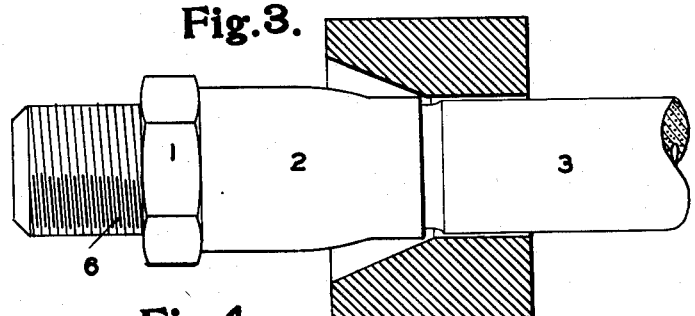
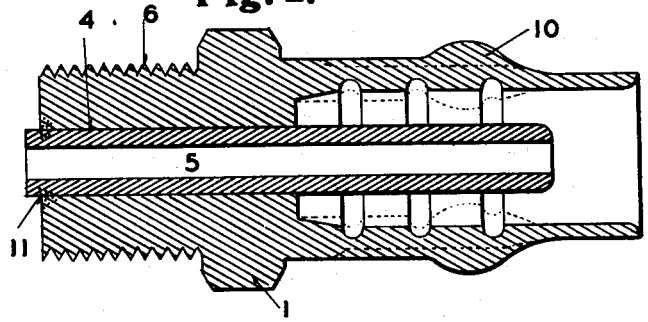
Inventor
A. BRUNNER
By  E. E. Huffman
Att'y.

Patented Dec. 17, 1935

2,024,507

UNITED STATES PATENT OFFICE 2,024,507

HOSE FITTING

Albert Brunner, St. Louis, Mo., assignor to Wagner Electric Corporation, St. Louis, Mo., a corporation of Delaware Application February 26, 1932, Serial No. 595,252

3 Claims. (Cl. 285—84)

My invention relates to a fitting or coupler member to be secured to the end of a hose embodying rubber or other compressible material, its object being to form, in an economical way, a simple connection between a hose and a fitting member which will not only be mechanically secure but also fluid-tight under very high pressure.

Other objects of my invention will become apparent from the following description taken in connection with the accompanying drawing in which Figure 1 is a cross sectional view of the fitting member and the hose in completed form; Figure 2 is a cross sectional view of the fitting as initially formed; Figure 3 illustrates a method of contracting the tubular extension; and Figure 4 is a cross sectional view of an initially formed modified fitting and nipple, the final form of the fitting being shown in dotted lines.

Referring to Figures 1 and 2, the numeral 1 indicates the main body of the fitting member which is provided with the usual wrench receiving surface. A tubular extension or sleeve 2, integral with the main body 1, is adapted to receive and embrace the end of the compressible hose 3 made of suitable material, such as rubber and fabric. The bore 4 in the main body of the fitting member receives a headed nipple 5 which also extends into the bore of the hose to a point adjacent the end of the tubular extension and is held in position by peening over the end of the fitting carrying the usual threaded portion 6 for cooperation with a threaded socket.

The tubular extension as initially formed, is shown in Figure 2 with its inner diameter being approximately the normal diameter of the uncompressed hose end, except the portion 7 adjacent the main body of the fitting which is reduced in diameter and preferably tapered, as shown. The inner surface of the tubular member is provided with the usual grooves for gripping the surface of the hose after compression of the extension. The major portion of the length of the tubular extension is formed with a thickened wall which tapers into the thinner wall adjacent the open end, so that when the extension is compressed the end of the hose adjacent the body of the fitting will be compressed but not the portion of the hose adjacent the open end of the extension, thus distributing the stresses on the hose so as to allow the hose to bend relative to the fitting without cracking.

In assembling the hose and fitting, the end of the hose which has an external diameter approximately equal to the internal diameter of the major portion of the initially formed extension, is inserted in the extension as far as the portion 7 of reduced diameter. The nipple is next inserted in the bore 4 of the body of the fitting member and secured in place by peening over the outer end of the fitting member. The extension 2 is now forced through a reducing die, the diameter of which is approximately the same as the external diameter of the open end of the extension. The progressive contraction of the extension from a point adjacent the open end toward the body of the fitting member, causes the hose to be compressed between the nipple and the extension and the extreme end of the hose to be forced into the tapered portion 7. The extension is only passed through the die to a point marked 8 on Figure 1 which is sufficient to give to the extension, in its completed form, approximately a uniform internal diameter over the half of its length adjacent the body of the fitting.

In the coupling just described, the end of the hose may not always be forced tightly against the main body of the fitting member during the contraction of the tubular extension which may result in leakage of fluid past the nipple and into the weave of the hose, thereby bursting the hose. To prevent any possibility of leakage, and insure against any fluid entering the weave of the hose, I have conceived the idea of placing a washer 9, of rubber or other compressible material, between the end of the hose and the main body of the fitting member. The washer may be dropped into the tubular extension before inserting the hose, or it may be attached to the end of the hose before assembly. The flow of the end of the hose material into the reduced portion 7 of the extension, during contraction of the extension, will cause the washer to be tightly compressed between the body of the fitting and the end of the hose. The pressure between the hose and the washer will, therefore, be not less than the pressure between the hose and the nipple at the extreme forward end of the hose.

In Figure 4 I have shown the tubular extension 2 as initially formed, provided with an external circumferential bulge 10 spaced from the open end of the extension. With this construction I am able to secure a greater compression of the hose at this point when the extension has been passed through the die, as shown by the dotted lines of Figure 4. In this figure I have also shown a plain tubular nipple instead of a headed one as in Figure 1. If the press fit of the nipple in the bore 4 is insufficient to hold the nipple in place, the end may be soldered to the fitting, as indicated at 11. It is noted that the thickness of the open end of the tubular extension may be somewhat increased if it is desired to slightly compress the hose at this point to assist in properly distributing the stresses in the hose during bending. The thickened portion of the initially formed fitting member shown in Figure 1, may also be of any desired length, depending, of course, upon what portion of the hose end the greatest pressure is desired. The bulge 18 shown in Figure 4 may also be placed on any portion of the length of the extension where additional pressure is desired.

Having fully described my invention, what I claim as new and desire to secure by Letters Patent of the United States is:

1. A hose fitting member comprising a body portion and a radially compressible tubular extension carried thereby for receiving the end of the hose, the internal diameter of said extension before compression being approximately the normal external diameter of the hose to be received thereby except adjacent the body portion where it is less than the normal hose diameter, and the external diameter of the extension over at least the half adjacent the body portion of the fitting being greater than the external diameter of the part adjacent the open end.

2. A fitting for a hose for compressible material comprising a nipple to enter the bore of the hose, and a radially compressible sleeve to embrace the end of the hose and clamp it against the nipple, said sleeve having an internal diameter before compression approximately the normal external diameter of the hose portion to be received thereby except at the part receiving the extremity of the hose where said diameter is less than said normal hose diameter, the external diameter of the sleeve adjacent its open end being less than the external diameter of the central portion, and the external diameter of the remaining portion of the sleeve being greater than the external diameter of the open end but less than the central portion.

3. A fitting for a hose of compressible material comprising a body portion, a nipple to enter the bore of the hose, a radially compressible sleeve integral with the body portion and adapted to embrace the end of the hose and clamp it against the nipple, and a compressible washer in pressure engagement with the end of the hose and the body portion, the internal diameter of said extension before compression being approximately the normal external diameter of the hose end to be received except adjacent the body portion where it is less than the normal hose diameter and the external diameter of said extension over at least the half adjacent the body portion being greater than the external diameter adjacent the open end, the internal diameter of said extension after compression being approximately uniform over a substantial portion of the length of the extension adjacent the body portion.

ALBERT BRUNNER.